United States Patent
Sutardja

(10) Patent No.: US 7,451,413 B1
(45) Date of Patent: Nov. 11, 2008

(54) METHODS OF MINIMIZING LEAKAGE CURRENT BY ANALYZING POST LAYOUT INFORMATION AND ASSOCIATED THRESHOLD VOLTAGE AND LEAKAGE CURRENT

(75) Inventor: Pantas Sutardja, San Jose, CA (US)

(73) Assignee: Marvell International Ltd., Hamilton (BM)

(*) Notice: Subject to any disclaimer, the term of this patent is extended or adjusted under 35 U.S.C. 154(b) by 964 days.

(21) Appl. No.: 10/402,438

(22) Filed: Mar. 27, 2003

Related U.S. Application Data

(60) Provisional application No. 60/438,071, filed on Jan. 3, 2003.

(51) Int. Cl.
*G06F 17/50* (2006.01)

(52) U.S. Cl. .................... 716/5; 716/1; 716/6

(58) Field of Classification Search .......... 716/4, 716/5, 6, 1; 365/63, 181
See application file for complete search history.

(56) References Cited

U.S. PATENT DOCUMENTS

| | | | | |
|---|---|---|---|---|
| 4,816,893 A | * | 3/1989 | Mayer et al. | 257/349 |
| 4,845,047 A | * | 7/1989 | Holloway et al. | 438/289 |
| 5,774,367 A | * | 6/1998 | Reyes et al. | 716/2 |
| 6,075,932 A | | 6/2000 | Khouja et al. | 716/4 |
| 6,111,427 A | * | 8/2000 | Fujii et al. | 326/34 |
| 6,209,122 B1 | * | 3/2001 | Jyu et al. | 716/6 |
| 6,462,978 B2 | | 10/2002 | Shibata et al. | 365/63 |
| 6,687,888 B2 | * | 2/2004 | Chen | 716/5 |
| 6,693,331 B2 | * | 2/2004 | Mistry et al. | 257/369 |
| 2002/0141234 A1 | | 10/2002 | Kaviani | 365/181 |
| 2002/0144223 A1 | | 10/2002 | Usami et al. | 716/4 |
| 2003/0163792 A1 | * | 8/2003 | Xie et al. | 716/4 |

FOREIGN PATENT DOCUMENTS

WO    WO 02/080368    10/2002

OTHER PUBLICATIONS

Smith, M.J.S., ed. "Introduction to ASICS," Chapter 1 *In, Application-Specific Integrated Circuits*. Addison-Wesley; Boston, MA, 1997, pp. 16-17.

Smith, M.J.S., ed. "Low-Level Design Entry," Chapter 9 *In, Application-Specific Integrated Circuits*. Addison-Wesley; Boston, MA, 1997, pp. 334-337.

\* cited by examiner

*Primary Examiner*—Sun J Lin

(57) ABSTRACT

Methods, systems and computer program products for automatically minimizing leakage current in a circuit design can include post layout delay information of a circuit that meets timing limits is analyzed. The circuit can include a first type of cells, and the first type of cells each can include a first threshold voltage and a first leakage current. After post layout delay information are analyzed, a non-speed-critical path in the circuit is selected. A dopant implant level of at least one transistor in at least one cell along the selected non-speed-critical path is modified to change the first threshold voltage of the transistor to a second threshold voltage and the first leakage current of the transistor to a second leakage current. In some implementations, the magnitude of the first threshold voltage is less than a magnitude of the second leakage current and the total leakage current of the circuit is reduced.

23 Claims, 4 Drawing Sheets

CIRCUIT DESIGN APPARATUS 200

ANALYZER 202

PATH SELECTOR 204

DOPLANT IMPLANT CIRCUIT 206

FIG. 2

METHODS OF MINIMIZING LEAKAGE CURRENT BY ANALYZING POST LAYOUT INFORMATION AND ASSOCIATED THRESHOLD VOLTAGE AND LEAKAGE CURRENT

This application claims priority of U.S. Provisional Application Ser. No. 60/438,071 titled "METHODS OF MINIMIZING LEAKAGE CURRENT," filed Jan. 3, 2003, the disclosure of which is incorporated herein by reference in it entirety.

BACKGROUND

The voltage used to drive large scale integrated circuits has been reduced in recent years, and the threshold voltages (Vt or Vth) of transistors have been lowered. Lowering threshold voltages increases sub-threshold leakage current. Leakage current may flow during an active period when a circuit is in operation and also flow during a standby period. A high speed logic circuit may have low threshold voltages but high leakage currents. There is a tradeoff between threshold voltage and leakage current.

Reducing leakage current during standby in devices such as cell phones, lap tops or personal digital assistants (PDAs) may increase the life of the devices batteries. There may be a desire for developing circuits with minimum possible leakage current.

So-called "Dual-Vth" technology has been developed to reduce leakage current. Circuit designers may use computer-aided design (CAD) systems to design dual-Vth circuits with both low threshold voltage cells (formed with low threshold voltage transistors) and high threshold voltage cells (formed with high threshold voltage transistors). Leakage current may be reduced by using high threshold voltage cells with low speed operation on a path with less critical timing needs. A path with more critical timing needs may use low threshold voltage cells with high speed operation. These paths have increased leakage current as a tradeoff for their increased speed.

SUMMARY

To design a circuit using Dual-Vth technology, the entire original circuit may first be designed with low threshold voltage cells. Then low threshold voltage cells in a path of the circuit with less critical timing needs may be substituted with higher threshold voltage cells to reduce leakage current.

In deep submicron complementary metal oxide semiconductor (CMOS) processes (e.g., 0.13 um and below), the source-drain leakage current may be large. It may be common for a chip with a size of only 5 $mm^2$, which may be considered small by today's standards, with a physical gate-length of 70 nm (typical of 0.09 um process or fast 0.13 um process) to have idle leakage current in the 100-mA range at 125 degrees Celsius junction temperature. This level of leakage current may be too large for many applications, and may be impossible especially with "Green" devices that have reduced standby power consumption levels.

The application relates to minimizing leakage current in circuit designs, such as circuits made by a deep submicron CMOS process. The circuits may be application specific integrated circuits (ASICs). A technique may use a computer-aided circuit design tool to automatically change a dopant implant level of transistors, which changes threshold voltages and leakage currents of the transistors, along less-time-critical paths of a circuit.

Another technique may allow a user to enter leakage power or current information in lieu of active power or current into a computer-aided circuit design tool. The tool minimizes leakage power, instead of minimizing active power, as in conventional techniques, and selects cells to replace in the circuit.

The techniques may have several advantages. For example, the first technique may reduce or eliminate a number of iterations of design steps during the design process. In addition, since this system modifies only the implantation, the layout does not change as a result of the modification. On the other hand, if conventional techniques are employed, then cells are replaced, and a new layout must then be determined for the new cells. This new layout may be different enough from the original layout such that electrical properties of the circuit may have changed. This could possibly result in different critical and less-time-critical paths.

An aspect of the application relates to a method comprising: analyzing post layout delay information of a circuit that meets timing limits, wherein the circuit comprises a first type of cells, the first type of cells each having a first threshold voltage and a first leakage current; selecting a path in the circuit; and modifying a dopant implant level of at least one transistor in at least one cell along the selected path to change the first threshold voltage of the transistor to a second threshold voltage and the first leakage current of the transistor to a second leakage current, wherein a total leakage current of the circuit is reduced. The method may further comprise selecting a non-speed-critical path.

Another aspect relates to a method of reducing leakage power with a computer-aided circuit design apparatus. The method comprises: receiving leakage power inputs in lieu of active power inputs for a first cell and a second cell from a user; storing leakage power information for the first cell and second cell, the first cell having a higher leakage power than the second cell, the first and second cells having at least one substantially similar property; generating a netlist for a user-designed circuit that comprises the first cell; and automatically replacing the first cell in the netlist with the second cell to reduce a leakage power in lieu of active power of the circuit.

BRIEF DESCRIPTION OF THE DRAWINGS

FIG. 2 illustrates a circuit design apparatus for automatically minimizing leakage current in a circuit design.

DETAILED DESCRIPTION

In many advanced design and/or fabrication processes, it may be relatively inexpensive to implement similar devices with different threshold voltages (Vt or Vth). "Devices" here may refer to transistors, resistors, etc. inside a "cell," which is inside an integrated circuit, which is inside a chip. For example, a device optimized for a "fast" 0.13 um process may have a standard threshold voltage around 0.25 V. Another device with a threshold voltage around 0.35 V may be somewhat slower but exhibit much lower turn-off, i.e., source-drain leakage current. The leakage current of the latter device may easily be less than $\frac{1}{10}$ the leakage current of the first device with the lower threshold voltage (Vt=0.25 V). Thus, substituting the latter device with a relatively small increase in threshold voltage (from 0.25 V to 0.35 V) may result in a much lower leakage current.

Many digital designs may use a design entry phase, a synthesis phase, a simulation/timing analysis phase, and an automatic place-and-route ("P&R") phase, among other phases, during the chip-design process. Place and route tools may use a netlist, critical path timing and other information to calculate delays.

An aspect of the present application may use a computer-aided design (CAD) tool for circuit simulation to automatically replace cell instances in a non-speed-critical path with the same functional cell constructed of higher threshold voltage devices (transistors). Cells in a speed-critical path of the circuit design may be unchanged with lower threshold voltage devices. The method may be applied to a deep submicron CMOS fabrication process.

Figure 1:
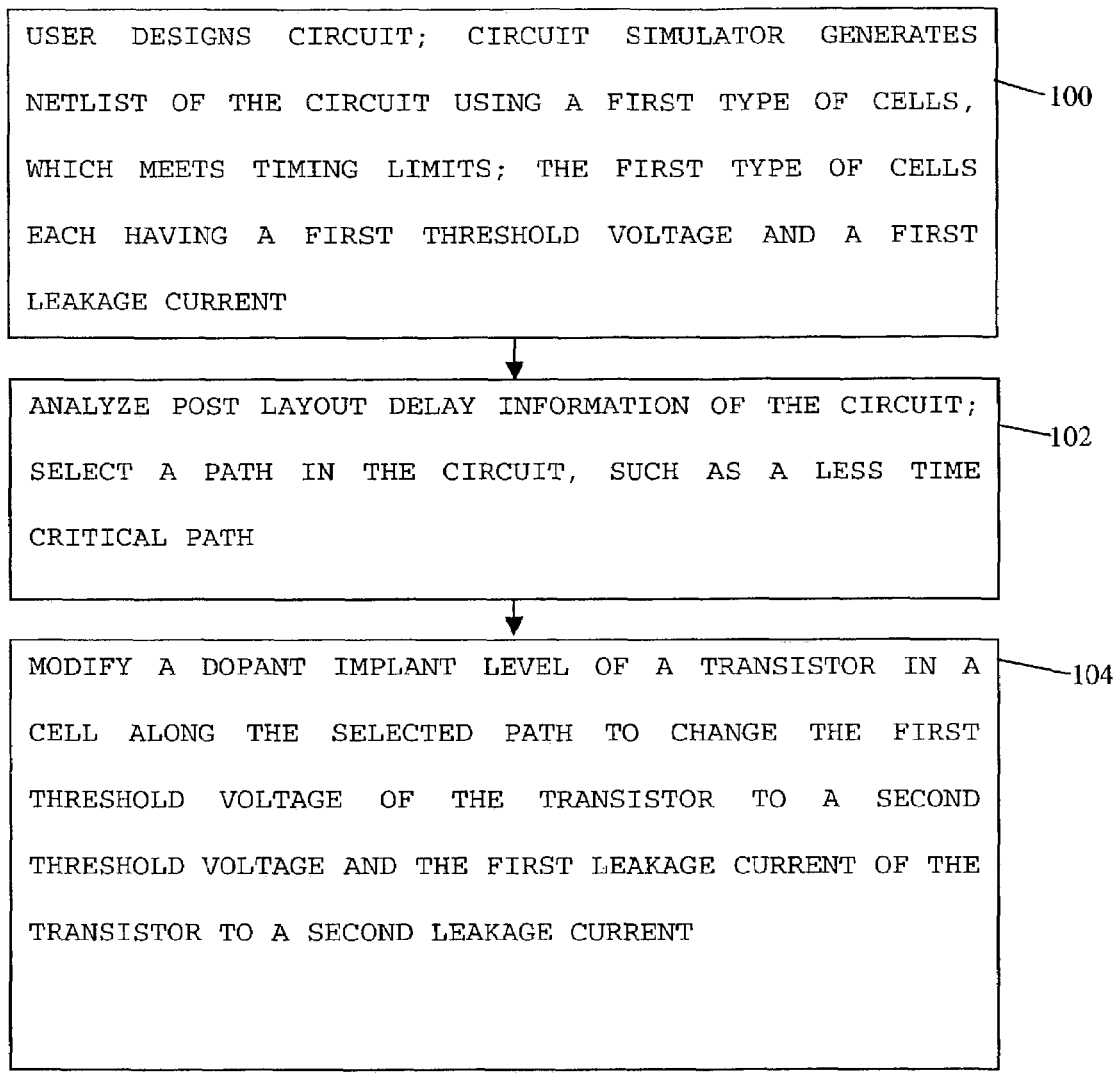
FIG. 1 illustrates a method of designing a circuit layout with a plurality of cells.

FIG. 1 illustrates a method of designing a circuit with a plurality of cells. A user designs a circuit layout with a computer-aided design (CAD) tool for circuit simulation, such as B SPICE, HSPICE or SPICE-3, Compass, Cadence, Mentor, Viewlogic and others ("circuit simulator") at 100. For example, the user may select and arrange a plurality of cells, logic gates or devices, such as transistors, and connect them to form a circuit. The circuit or a section of the circuit may include a single type of cells, e.g., cells with the same threshold voltage level and leakage current.

After the user designs the circuit, the circuit simulator generates an original netlist of the circuit, which may be an ASCII file that describes circuit connectivity and circuit values. For example, the netlist may include node names, descriptions of connections between cells, voltage and current levels, simulated time and frequency results, and parameters of each cell used in the circuit, e.g., implant/dopant levels of sources and drains in transistors. The circuit design associated with the original netlist may meet timing requirements, while the circuit or a section of the circuit uses a single type of cells, e.g., cells with the same threshold voltage level and leakage current. The single type of cells may include relatively low threshold voltage devices (higher speed, higher leakage current).

The circuit simulator analyzes post layout delay information in the netlist, from a place and route tool or another source at 102. The circuit simulator, critical path analyzer or the user may use the delay information sources to identify time-critical and less-time critical paths of the circuit. "Time critical" and "speed critical" may be used interchangeably in this description.

The circuit simulator automatically replaces/modifies one or more or all cells along an identified non-speed-critical path or a less-time-critical path with higher threshold voltage (lower leakage current) cells, which correspond to the replaced cells at 104. This reduces leakage current. One way of replacing/modifying cells is to modify a dopant implant level of transistor sources and drains, which changes a threshold voltage and thus leakage current of the transistors. The circuit simulator may replace/modify cells in a plurality of less-time-critical paths and/or sections of a circuit. There may be a plurality of characteristics that make a substitute high threshold voltage cell "correspond" to the original cell, such as size, area, comparable delay time, number of transistors used, etc.

If the method selects a non-speed-critical path, a magnitude of a first threshold voltage of a first cell type may be less than a magnitude of a second threshold voltage of a second cell type. Leakage current of the first cell type may be greater than leakage current of the second cell type. Cells which are not along the non-speed-critical path may constitute a first area on an integrated circuit. A modified transistor may constitute a second area on the integrated circuit, wherein the first area is less than the second area.

Alternatively, a method may start with a circuit design that has high threshold voltage cells which barely meet timing limits for a place-and-route (P&R) process by the circuit simulator. The circuit simulator may analyze a final delay obtained from the circuit layout. The circuit simulator may replace/modify high threshold voltage cells with corresponding low threshold voltage cells in any path that does not meet timing limits. The cells may be replaced by modifying dopant implant levels of transistor sources and drains, which changes threshold voltages of the transistors. This method works but may be less efficient in general for very high speed designs.

The methods described herein may be implemented by computer-aided design software and computer systems for automatically minimizing leakage current in a circuit design.

FIG. 2 illustrates a circuit design apparatus 200 for automatically minimizing leakage current in a circuit design. The circuit design apparatus 200 comprises an analyzer 202, a path selector 204, and a dopant implant circuit 206. These components 202, 204, 206 may overlap and may comprise software and/or hardware.

The analyzer 202 analyzes post layout delay information of a circuit that meets timing limits, wherein the circuit is composed of a first type of cells. Each cell of the first type has a first threshold voltage and a first leakage current.

The path selector 204 may select a path in the circuit, such as a critical path, a less critical path or a non-critical path.

The dopant implant circuit 206 may modify a dopant implant level of at least one transistor in at least one cell along the selected path to change the first threshold voltage of the transistor to a second threshold and the first leakage current of the transistor to a second leakage current. A total leakage current of the circuit is reduced or minimized.

The path selector 204 may select a non-speed-critical path, wherein a magnitude of the first threshold voltage is less than a magnitude of the second threshold voltage, and the first leakage current is greater than the second leakage current.

The path selector 204 may select a critical path, wherein a magnitude of the first threshold voltage is greater than a magnitude of the second threshold voltage, and the first leakage current is less than the second leakage current.

The cells may form an integrated circuit. The selector 204 may select a non-speed-critical path, wherein the first threshold a magnitude of is less than a magnitude of the second threshold voltage, and the first leakage current is greater than the second leakage current. The cells not along the non-speed-critical path may constitute a first area on the integrated circuit. The transistor modified by the dopant implant circuit 206 may constitute a second area on the integrated circuit. The first area may be less than the second area.

The path selector 204 may select a critical path, wherein a magnitude of the first threshold voltage is greater than a magnitude of the second threshold voltage, and the first leakage current is less than the second leakage current. The cells not along the critical path may constitute a first area on the integrated circuit. The transistor modified in the dopant implant circuit 206 may constitute a second area on the integrated circuit. The first area may be greater than the second area.

The dopant implant circuit 206 may modify a dopant implant level of each cell along the path selected by the path selector 204.

On the other hand, if conventional techniques are employed, wherein cells are replaced, a new layout must then be determined. This new layout may be different enough from the original layout such that electrical properties of the circuit may have changed. For example, cell replacement may change routes and paths with changes in parasitic capacitances and timing. This could possibly result in different critical and less-time-critical paths.

Reducing Leakage Power

In another embodiment of the present invention, a computer-aided circuit design tool minimizes leakage power (or current), instead of minimizing active power (or current) as in conventional techniques, and selects cells to replace with lower leakage power cells. In general, some conventional computer-aided circuit design tools have features to minimize active power. These tools are generally not utilized to design circuits in which leakage power is reduced or minimized. The inventor proposes to input leakage power information in lieu of active power into a computer-aided circuit design tool. In this manner, these design tools will reduce or minimize leakage power (rather than the active power), as explained in detail below.

Figure 3:
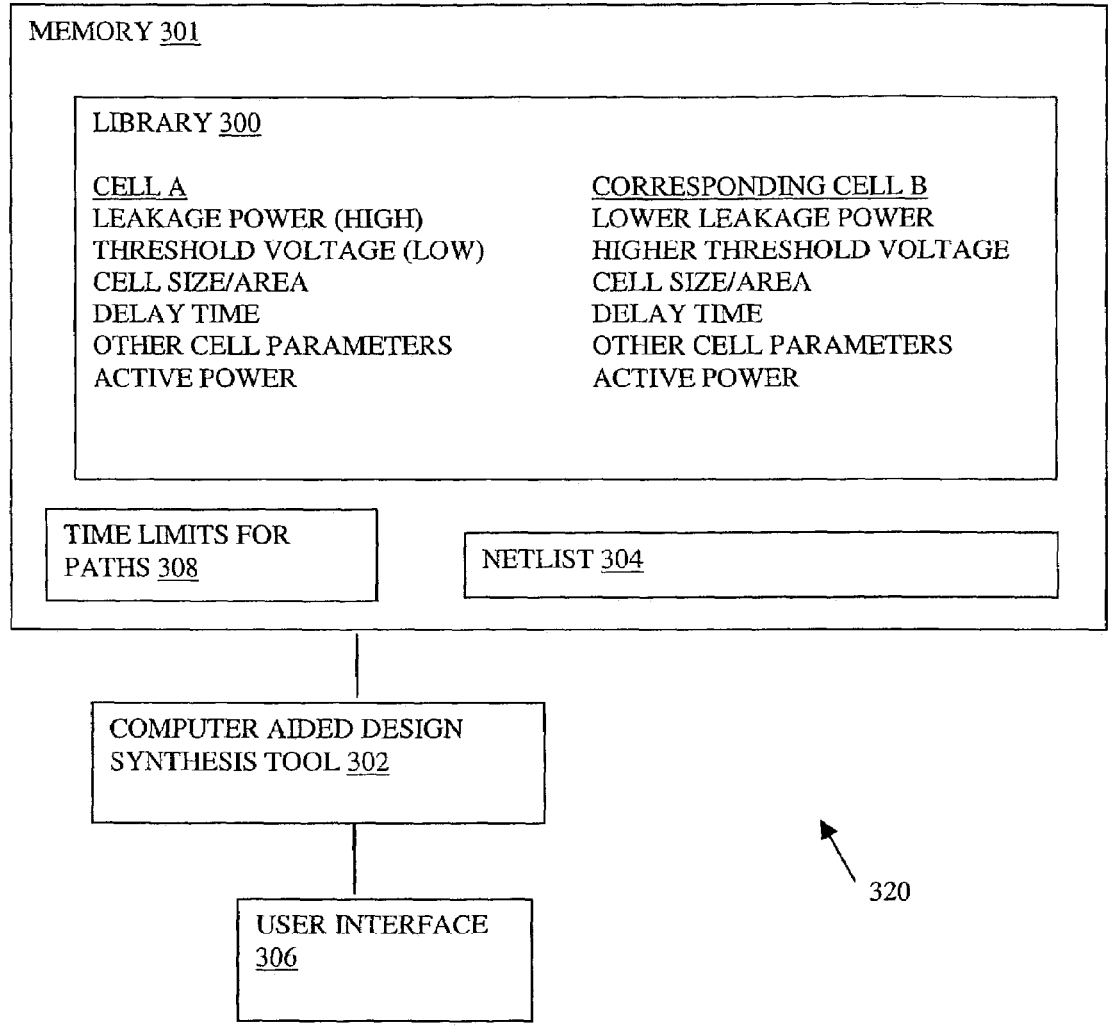
FIG. 3 illustrates a computer system that chooses low and high threshold voltage cells automatically for a netlist.

FIG. 3 illustrates a computer system 320 that may implement the latter embodiment. A user may use a user interface 306, such as a keyboard, mouse and monitor, to enter instructions, circuit designs and cell parameters, such as active power (or active current) information of transistors, to a CAD logic synthesis software tool 302. The user uses the synthesis tool 302 to select cells stored in a cell library 300 in a memory 301 to design a circuit. The synthesis tool 302 generates a netlist 304 for the circuit. The synthesis tool 302 may automatically choose low and high threshold voltage cells for the netlist 304 starting from behavioral codes in the cell library 300.

The cell library 300 may include "corresponding" high and low threshold voltage cells A, B of essentially the same size/area. The cell library 300 may include active power as a cell parameter to entered by the user into the synthesis tool 302. The library 300 may also store delay times, cell size/area and other cell parameters.

The synthesis tool 302 attempts to meet timing limits as its primary goal and then reduce active power as a secondary goal. There may be other secondary goals. The netlist 304 entered into the synthesis/place and route tool 302 may already be nearly optimal. This approach may still perform post-layout analysis. Any path in the circuit that does not meet a timing limit 308 may have higher threshold voltage cells replaced by lower threshold voltage cells. Any path that already meets timing limits may be left unmodified.

Instead of active power information, the user may enter leakage power information of transistors using the same system 320. The synthesis tool 302 may automatically reduce or minimize leakage power or current (rather than active power) of the circuit in a manner similar as described above.

Figure 4:
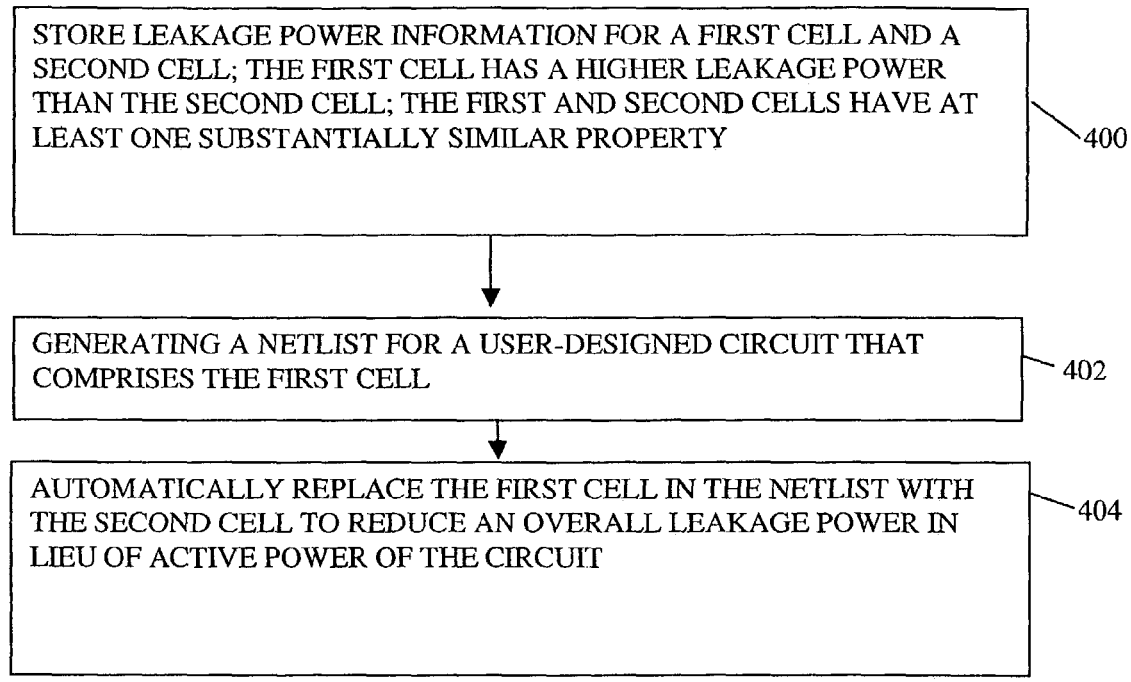
FIG. 4 illustrates a method of using the system of FIG. 3.

FIG. 4 illustrates a method of using the system 320 of FIG. 3 described above. The method stores leakage power information for a first cell and a second cell at 400. The first cell has a higher leakage power than the second cell. The first and second cells have at least one substantially similar property.

The method generates a netlist for a user-designed circuit that comprises the first cell at 402.

The method automatically replaces the first cell in the netlist with a second cell to reduce an overall leakage power in lieu of active power of the circuit at 404.

The methods above may design an integrated circuit with an automatically-routed section or path using mixed threshold voltage cells, i.e., at least one relatively high threshold voltage cell and at least one relatively low threshold voltage cell.

A number of embodiments have been described. Nevertheless, it will be understood that various modifications may be made without departing from the spirit and scope of the application. Accordingly, other embodiments are within the scope of the following claims.

The invention claimed is:

1. A method for automatically minimizing leakage current in a circuit design comprising:
   a) analyzing post layout delay information of a circuit that meets timing limits, wherein the circuit comprises a first type of cells, the first type of cells each having a first threshold voltage and a first leakage current;
   b) after analyzing post layout delay information, selecting a non-speed-critical path in the circuit; and
   c) modifying a dopant implant level of at least one transistor in at least one cell along the selected non-speed-critical path to change the first threshold voltage of the transistor to a second threshold voltage and the first leakage current of the transistor to a second leakage current, wherein a magnitude of the first threshold voltage is less than a magnitude of the second threshold voltage, wherein the first leakage current is greater than the second leakage current, and wherein a total leakage current of the circuit is reduced.

2. The method of claim 1, further comprising using said cells to form an integrated circuit, wherein said step (b) comprises selecting a non-speed critical path, wherein a magnitude of the first threshold voltage is less than a magnitude of the second threshold voltage and wherein the first leakage current is greater than the second leakage current, wherein cells not along the non-speed-critical path constitute a first area on the integrated circuit, wherein the least one transistor modified in step (c) constitutes a second area on the integrated circuit, wherein the first area is less than the second area.

3. The method of claim 1, further comprising using said cells to form an integrated circuit, wherein said step (b) comprises selecting a critical path, wherein a magnitude of the first threshold voltage is greater than a magnitude of the second threshold voltage and wherein the first leakage current is less than the second leakage current, wherein cells not along the critical path constitute a first area on the integrated circuit, wherein the least one transistor modified in step (c) constitutes a second area on the integrated circuit, wherein the first area is greater than the second area.

4. The method of claim 2, wherein modifying a dopant implant level includes modifying a dopant implant level of each cell along the path selected in step (b).

5. A computer-aided design software for automatically minimizing leakage current in a circuit design comprising:
   a) analyzing post layout delay information of a circuit that meets timing limits, wherein the circuit comprises a first type of cells, the first type of cells each having a first threshold voltage and a first leakage current;
   b) after analyzing post layout delay information, selecting a non-speed-critical path in the circuit based on the post layout delay information; and
   c) modifying a dopant implant level of at least one transistor in at least one cell along the selected non-speed-critical path to change the first threshold voltage of the transistor to a second threshold voltage and the first leakage current of the transistor to a second leakage current, wherein the first threshold voltage is less than the second threshold voltage, wherein the first leakage current is greater than the second leakage current, and wherein a total leakage current of the circuit is minimized.

6. The computer-aided design software of claim 5, further comprising using said cells to form an integrated circuit, wherein said step (b) comprises selecting a non-speed-critical path, wherein the first threshold voltage is less than the second threshold voltage and wherein the first leakage current is greater than the second leakage current, wherein cells not along the non-speed-critical path constitute a first area on the integrated circuit, wherein the least one transistor modified in step (c) constitutes a second area on the integrated circuit, wherein the first area is less than the second area.

7. The computer-aided design software of claim 5, further comprising using said cells to form an integrated circuit, wherein said step (b) comprises selecting a critical path, wherein the first threshold voltage is greater than the second threshold voltage and wherein the first leakage current is less than the second leakage current, wherein cells not along the critical path constitute a first area on the integrated circuit, wherein the least one transistor modified in step (c) constitutes a second area on the integrated circuit, wherein the first area is greater than the second area.

8. The computer-aided design software of claim 5, wherein modifying a dopant implant level includes modifying a dopant implant level of each cell along the path selected in step (b).

9. A circuit design apparatus for automatically minimizing leakage current in a circuit design comprising:
  a) an analyzer to analyze post layout delay information of a circuit that meets timing limits, wherein the circuit comprises a first type of cells, the first type of cells each having a first threshold voltage and a first leakage current;
  b) a path selector to select a non-speed-critical path in the circuit based on the post layout delay information; and
  c) a dopant implant circuit to modify a dopant implant level of at least one transistor in at least one cell along the selected non-speed-critical path to change the first threshold voltage of the transistor to a second threshold voltage and the first leakage current of the transistor to a second leakage current, wherein the first threshold voltage is less than the second threshold voltage, wherein the first leakage current is greater than the second leakage current, and wherein a total leakage current of the circuit is minimized.

10. The circuit design apparatus of claim 9, further comprising using said cells to form an integrated circuit, wherein said selector selects a non-speed-critical path, wherein the first threshold voltage is less than the second threshold voltage and wherein the first leakage current is greater than the second leakage current, wherein cells not along the non-speed-critical path constitute a first area on the integrated circuit, wherein the least one transistor modified by said dopant implant circuit constitutes a second area on the integrated circuit, wherein the first area is less than the second area.

11. The circuit design apparatus of claim 9, further comprising using said cells to form an integrated circuit, wherein said path selector selects a critical path, wherein the first threshold voltage is greater than the second threshold voltage and wherein the first leakage current is less than the second leakage current, wherein cells not along the critical path constitute a first area on the integrated circuit, wherein the least one transistor modified in said dopant implant circuit constitutes a second area on the integrated circuit, wherein the first area is greater than the second area.

12. The circuit design apparatus of claim 9, wherein said dopant implant circuit modifies a dopant implant level of each cell along the path selected by said path selector.

13. A circuit design apparatus for automatically minimizing leakage current in a circuit design comprising:

a) analyzer means for analyzing post layout delay information of a circuit that meets timing limits, wherein the circuit comprises a first type of cells, the first type of cells each having a first threshold voltage and a first leakage current;
  b) path selector means for selecting a non-speed-critical path in the circuit based on the post layout delay information; and
  c) dopant implant means for modifying a dopant implant level of at least one transistor in at least one cell along the selected non-speed-critical path to change the first threshold voltage of the transistor to a second threshold voltage and the first leakage current of the transistor to a second leakage current, wherein the first threshold voltage is less than the second threshold voltage, wherein the first leakage current is greater than the second leakage current, and wherein a total leakage current of the circuit is minimized.

14. The circuit design apparatus of claim 13, further comprising using said cells to form an integrated circuit, wherein said path selector means selects a non-speed-critical path, wherein the first threshold voltage is less than the second threshold voltage and wherein the first leakage current is greater than the second leakage current, wherein cells not along the non-speed-critical path constitute a first area on the integrated circuit, wherein the least one transistor modified by said dopant implant means constitutes a second area on the integrated circuit, wherein the first area is less than the second area.

15. The circuit design apparatus of claim 13, further comprising using said cells to form an integrated circuit, wherein said path selector means selects a critical path, wherein the first threshold voltage is greater than the second threshold voltage and wherein the first leakage current is less than the second leakage current, wherein cells not along the critical path constitute a first area on the integrated circuit, wherein the least one transistor modified in said dopant implant means constitutes a second area on the integrated circuit, wherein the first area is greater than the second area.

16. The circuit design apparatus of claim 13, wherein said dopant implant means modifies a dopant implant level of each cell along the path selected by said path selector means.

17. A method of reducing leakage power with a computer-aided circuit design apparatus, the method comprising:
  receiving leakage power inputs in lieu of active power inputs for a first cell and a second cell from a user;
  storing leakage power information for the first and second cells, the first cell having a higher leakage power than the second cell, the first and second cells having at least one substantially similar property,
  generating a netlist for a user-designed circuit that comprises the first cell;
  performing a layout operation using the netlist to generate a circuit layout;
  analyzing post layout delay information of the circuit layout;
  after analyzing post layout delay information, selecting a path in the circuit layout including the first cell; and
  automatically replacing the first cell in the netlist path with the second cell to reduce leakage power in lieu of active power of the circuit.

18. The method of claim 17 wherein selecting the path occurs after layout but prior to physical placement of cells in the circuit.

19. A method of reducing leakage power with a computer-aided circuit design apparatus, the method comprising:

receiving leakage power inputs in lieu of active power inputs for a first cell and a second cell from a user, wherein the first and second cells have substantially similar sizes;

storing leakage power information for the first and second cells, the first cell having a higher leakage power than the second cell, the first and second cells having at least one substantially similar property;

generating a netlist for a user-designed circuit that comprises the first cell; and automatically replacing the first cell in the netlist with the second cell to reduce leakage power in lieu of active power of the circuit.

20. A method for automatically minimizing leakage current in a circuit design comprising:

storing leakage current information for a first type of cell having a first leakage current and a second type of cell having a second leakage current;

generating a netlist for a user-designed circuit that meets timing limits and leakage current limits, the netlist including the first type of cells and the second type of cells;

performing a layout operation using the netlist to generate a circuit layout;

analyzing post layout delay information of the circuit layout;

after analyzing post layout delay information, selecting a path in the circuit layout including the first type of cell; and automatically replacing the first type of cell in the path with the second type of cell.

21. The method of claim 20, wherein said selecting comprises selecting a path that does not meet the timing limits, wherein the first leakage current is lower than the second leakage current, and wherein said replacing causes the path to meet the timing limits.

22. The method of claim 20, wherein said selecting comprises selecting a non-speed critical path, wherein the first leakage current is higher than the second leakage current, and wherein the total leakage current of the circuit is reduced.

23. The method of claim 20 wherein selecting the path occurs after layout but prior to physical placement of cells in the circuit.

* * * * *